US012362571B2

United States Patent
Yang et al.

(10) Patent No.: US 12,362,571 B2
(45) Date of Patent: Jul. 15, 2025

(54) PHOTOVOLTAIC SYSTEM AND COMMUNICATION METHOD THEREFOR

(71) Applicant: Sungrow Power Supply Co., Ltd., Hefei (CN)

(72) Inventors: Yu Yang, Hefei (CN); Yanfei Yu, Hefei (CN); Jun Xu, Hefei (CN); Zongjun Yang, Hefei (CN); Xinyu Wang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/909,695

(22) PCT Filed: Mar. 8, 2021

(86) PCT No.: PCT/CN2021/079464
§ 371 (c)(1),
(2) Date: Sep. 6, 2022

(87) PCT Pub. No.: WO2021/190283
PCT Pub. Date: Sep. 30, 2021

(65) Prior Publication Data
US 2023/0106494 A1     Apr. 6, 2023

(30) Foreign Application Priority Data
Mar. 27, 2020   (CN) .......................... 202010230872.2

(51) Int. Cl.
*H02J 3/38*   (2006.01)
*H02J 3/46*   (2006.01)
(Continued)

(52) U.S. Cl.
CPC ................ *H02J 3/381* (2013.01); *H02J 3/46* (2013.01); *H02S 40/36* (2014.12); *H02S 50/10* (2014.12);
(Continued)

(58) Field of Classification Search
CPC .......... H02J 3/381; H02J 3/46; H02J 2300/24; H02J 2300/26; H02S 40/32; H02S 40/36; H02S 50/10; H04B 3/548
See application file for complete search history.

(56) References Cited

U.S. PATENT DOCUMENTS 9,557,367 B2 *   1/2017   Fornage ................... H02S 40/32
9,680,301 B2     6/2017   Johnson et al.
(Continued)

FOREIGN PATENT DOCUMENTS

CN    101777797 A    7/2010
CN    102081585 A    6/2011
(Continued)

OTHER PUBLICATIONS

Second Examination Report for Australian Patent Application No. 2021240619, dated Aug. 23, 2023.
(Continued)

*Primary Examiner* — Levi Gannon
(74) *Attorney, Agent, or Firm* — Wolf, Greenfield & Sacks, P.C.

(57) ABSTRACT

A photovoltaic system and a communication method therefor. The communication method includes: each slave sends a report signal to a host, and monitors a response signal of the host; and if the at least one slave receives the response signal, the corresponding slave executes a corresponding action on the basis of the response signal. Therefore, communication between the host and each slave is achieved in a mode that each slave actively sends the report signal, the host is prevented from adopting a roll call query mode, and occupation of bus resources by the host is reduced.

15 Claims, 4 Drawing Sheets

(51) Int. Cl.
 *H02S 40/36* (2014.01)
 *H02S 50/10* (2014.01)
 *H04B 3/54* (2006.01)
 *H04L 12/40* (2006.01)

(52) U.S. Cl.
 CPC ....... *H04B 3/548* (2013.01); *H04L 12/40039* (2013.01); *H02J 2300/24* (2020.01)

(56) References Cited

U.S. PATENT DOCUMENTS

| | | | |
|---|---|---|---|
| 2009/0080226 A1* | 3/2009 | Fornage | G05F 1/67 363/74 |
| 2011/0170222 A1* | 7/2011 | Fornage | H02J 3/381 361/93.8 |
| 2011/0232714 A1* | 9/2011 | Bhavaraju | H02J 3/381 307/82 |
| 2012/0049637 A1* | 3/2012 | Teichmann | H02J 3/381 307/82 |
| 2012/0050924 A1* | 3/2012 | Matsuo | H02S 40/34 361/42 |
| 2012/0176076 A1* | 7/2012 | Mansfield | H02J 3/381 320/101 |
| 2012/0176079 A1* | 7/2012 | Nakashima | H01M 10/465 320/101 |
| 2015/0028692 A1 | 1/2015 | Mahkota et al. | |
| 2016/0118934 A1* | 4/2016 | Johnson | H02S 40/34 136/244 |
| 2017/0047740 A1 | 2/2017 | Narla | |
| 2017/0207693 A1* | 7/2017 | Geng | H02M 7/44 |
| 2018/0026450 A1* | 1/2018 | Moriyama | H02M 3/1584 307/51 |
| 2018/0342873 A1 | 11/2018 | Wang et al. | |
| 2019/0027617 A1* | 1/2019 | Varlan | H02S 50/10 |
| 2020/0266630 A1 | 8/2020 | Jiang et al. | |
| 2022/0255502 A1* | 8/2022 | Kojima | H02S 40/36 |

FOREIGN PATENT DOCUMENTS

| | | |
|---|---|---|
| CN | 102088386 A | 6/2011 |
| CN | 103414547 A | 11/2013 |
| CN | 104780086 A | 7/2015 |
| CN | 106254023 A | 12/2016 |
| CN | 106297221 A | 1/2017 |
| CN | 106357301 A | 1/2017 |
| CN | 207368922 U | 5/2018 |
| CN | 108259068 A | 7/2018 |
| CN | 110417347 A | 11/2019 |
| CN | 110704265 A | 1/2020 |
| CN | 111262767 A | 6/2020 |
| EP | 2 244 066 A1 | 10/2010 |
| EP | 3 407 156 A1 | 11/2018 |
| WO | WO 2019/091188 A1 | 5/2019 |

OTHER PUBLICATIONS

First Office Action for Australian Application No. 2021240619, dated May 2, 2023.

International Search Report and Written Opinion for International Application No. PCT/CN2021/079464, mailed Jun. 2, 2021.

Extended European Search Report for European Application No. 21774670.0, dated Dec. 6, 2023.

* cited by examiner

PHOTOVOLTAIC SYSTEM AND COMMUNICATION METHOD THEREFOR

This application is a national stage under 35 U.S.C. § 371 of International Patent Application Serial No. PCT/CN2021/079464, filed Mar. 8, 2021, which claims priority to Chinese Patent Application No. 202010230872.2, entitled "PHOTOVOLTAIC SYSTEM AND COMMUNICATION METHOD THEREFOR", filed on Mar. 27, 2020 with the China National Intellectual Property Administration. The contents of these applications are incorporated herein by reference in their entireties.

FIELD

The present disclosure relates to the technical field of grid-connected photovoltaic power generation, and in particular to a photovoltaic system and a communication method for the photovoltaic system.

BACKGROUND

According to rapid shutdown requirements set for photovoltaic systems by the National Electrical Code 2017, a voltage between a conductor within 1 foot from a photovoltaic array and the ground shall not exceed 80V after shutdown protection.

Figure 1:
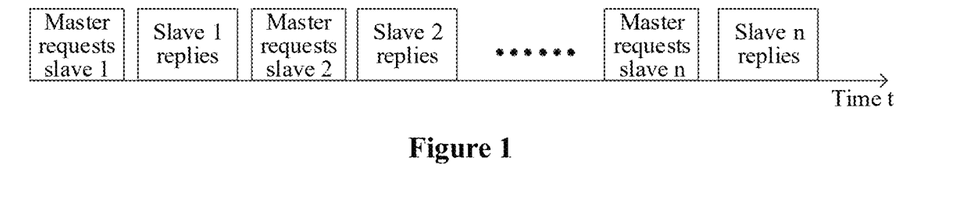
FIG. 1 is a schematic diagram illustrating data flow in the optimizer-based PLC according to the conventional technology.

In order to meet the rapid shutdown requirements, optimizer-based PLC (power line communication) is proposed in the conventional technology. FIG. 1 is a schematic diagram illustrating data flow in the optimizer-based PLC. A master requests a slave i sequentially, and the slave i replies, where i=1, 2, . . . n, and n is the number of slaves. In the optimizer-based PLC, the master-slave principle is combined with the heartbeat. The two-way communication between the slave and the master is achieved while satisfying the heartbeat. In the system, data such as a voltage, a current and a temperature of the slave is collected. However, the master occupies a large amount of bus bandwidth for active requesting.

SUMMARY

In view of this, a photovoltaic system and a communication method for the photovoltaic system are provided according to the present disclosure. In this method, a slave actively reports to a master and the master replies, so that the master occupies less bus bandwidth.

A communication method is provided according to a first aspect of the present disclosure. The communication method is applied to a photovoltaic system. In the photovoltaic system, a master is communicatively connected to each of slaves, and photovoltaic modules output electric energy via the slaves respectively. The communication method includes: sending, by each of the slaves, a report signal to the master and monitoring, by the slave, a reply signal from the master; and performing an action by the slave based on the reply signal in response to successfully receiving the reply signal by the slave.

Optionally, the communication method further includes: switching the slave off by the slave in response to failing to receive the reply signal in a preset period of time by the slave after the sending, by the slave, a report signal to the master, to cut off a path through which the photovoltaic module corresponding to the slave outputs electric energy.

Optionally, the sending, by each of the slaves, a report signal to the master: sending, by the slaves, respective report signals to the master one by one in a report order in a preset list.

Optionally, the sending, by each of the slaves, a report signal to the master and monitoring, by the slave, a reply signal from the master includes: sending, by the slaves, the respective report signals to the master one by one in the report order in the preset list, and monitoring, by the slave, the reply signal from the master immediately after the sending the report signal to the master by the slave.

Optionally, the sending, by each of the slaves, a report signal to the master and monitoring, by the slave, a reply signal from the master includes: sending, by the slaves, the respective report signal to the master one by one in the report order in the preset list; and monitoring, by all the slaves, the reply signal from the master simultaneously after all the report signals are sent to the master.

Optionally, the communication method further includes: sending the reply signal by the master. The sending the reply signal by the master includes: sending the reply signal that carries a start command by the master to the slave after the sending, by the slave, a report signal to the master and before the slave is switched on, to switch on the slave; or sending a start signal by the master to the slave after the photovoltaic system is started and before the sending, by the slave, a report signal to the master, until all the slaves are switched on.

Optionally, the communication method further includes: determining, by the master based on all the report signals, whether a condition for sending a reply signal that carries a start command is met before the sending the reply signal that carries the start command by the master to the slave, where the reply signal that carries the start command is sent if it is determined that the condition for sending the reply signal that carries the start command is met.

Optionally, the determining, by the master based on all the report signals, whether a condition for sending the reply signal that carries a start command is met includes: calculating, by the master, a sum of voltages of all the photovoltaic modules respectively carried in all the report signals, and determining, by the master, whether the sum of the voltages of all the photovoltaic modules is sufficient to start an inverter in the photovoltaic system, where the condition for sending the reply signal that carries a start command is determined to be met if it is determined that the sum of the voltages of all the photovoltaic modules is sufficient to start the inverter in the photovoltaic system.

Optionally, the report signal includes state information of the slave and/or a serial number of the slave.

Optionally, in a case that the reply signal is a modulated signal, the reply signal is a simple signal indicating success/failure. In a case that the reply signal is an analog signal, the reply signal is a combined signal composed of the report signal from the slaves and a simple signal indicating success/failure.

Optionally, the communication method further includes: updating a preset list in all the slaves by the master after the photovoltaic system is started.

Optionally, the communication method further includes: sending the preset list by the master to all the slaves after the photovoltaic system is mounted, so that all the slaves each are configured with the preset list.

A photovoltaic system is provided according to a second aspect of the present disclosure. The photovoltaic system includes a direct current bus, at least one inverter, at least one master, N slaves and N photovoltaic modules. N is a positive integer. Output ends of the N slaves are cascaded to form a branch, and input ends of the N slaves are connected to output ends of the N photovoltaic modules in a one-to-one correspondence. A positive electrode and a negative electrode of the branch are connected to a direct current side of the inverter via the direct current bus. The master is communicatively connected to each of the N slaves. The master and each of the N slaves are configured to perform the communication method according to the first aspect.

Optionally, the slave is a circuit breaker or an optimizer in the photovoltaic system.

Optionally, the master is a controller inside the inverter and is communicatively connected to each of the N slaves through power line carrier communication or wireless communication. Alternatively, the master is an independent controller arranged on the direct current bus and communicatively connected to each of the N slaves through power line carrier communication. Alternatively, the master is an independent controller communicatively connected to each of the N slaves through wireless communication.

It can be seen from the above technical solutions that, the communication method applied to a photovoltaic system according to the present disclosure includes: sending a report signal by the slave to the master and monitoring a reply signal by the slave from the master; and performing an action by the slave based on the reply signal in response to success of the slave in receiving the reply signal. Therefore, communication between the master and each slave is achieved by the slave actively sending the report signal rather than by the master actively requesting the slave, thereby reducing occupation of bus resources by the master.

DETAILED DESCRIPTION OF EMBODIMENTS

The technical solutions according to the embodiments of the present disclosure will be described clearly and completely below in conjunction with the drawings in the embodiments of the present disclosure. It is apparent that the described embodiments are only some rather than all of the embodiments of the present disclosure. Any other embodiments obtained by those skilled in the art based on the embodiments in the present disclosure without any creative efforts fall within the protection scope of the present disclosure.

In this specification, terms "comprise", "include", or any other variants thereof are intended to encompass a non-exclusive inclusion, such that the process, method, article, or device including a series of elements includes not only those elements but also other elements that are not explicitly listed, or the elements that are inherent to the process, method, article, or device. Unless expressively limited otherwise, a process, method, article or device limited by "comprising/including a(n) . . . " does not exclude existence of another identical element in the process, method, article or device.

A communication method for a photovoltaic system is provided according to the embodiments of the present disclosure, so as to solve the problem in the conventional technology that a master occupies a large amount of bus bandwidth since a request signal sent by the master to a slave carries a communication address of the slave.

Figure 2:
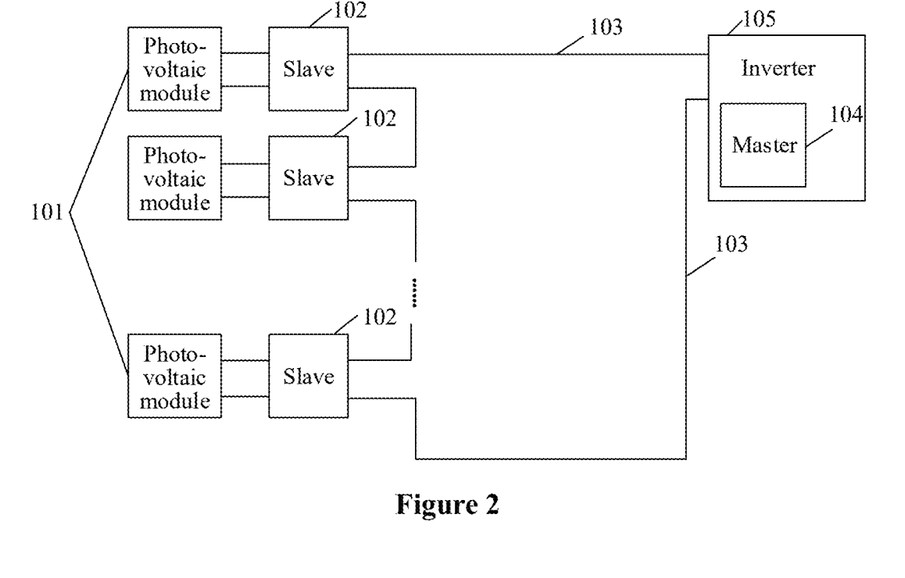
FIG. 2 is a schematic structural diagram illustrating a photovoltaic system according to an embodiment of the present disclosure.

Reference is made to FIG. 2, which is a schematic structural diagram illustrating a photovoltaic system. A master 104 is communicatively connected to each slave 102. A photovoltaic module 101 outputs electric energy via a slave 102 corresponding to the photovoltaic module 101.

Figure 3:
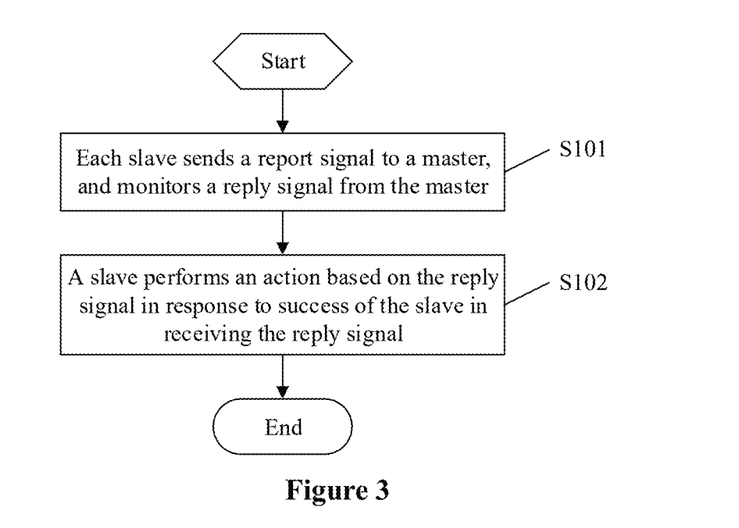
FIG. 3 is a flowchart illustrating a communication method for a photovoltaic system according to an embodiment of the present disclosure.

Referring to FIG. 3, a communication method for the photovoltaic system includes the following steps S101 to S102.

In S101, each slave sends a report signal to a master, and monitors a reply signal from the master.

The reply signal may be a simple signal indicating success/failure. That is, the reply signal from the master only indicates success/failure, rather than includes communication address information of a target communication slave. Therefore, the reply signal has relatively small amount of data and thus occupies less bandwidth. Alternatively, the reply signal carries commands such as switching on, switching off, and information acquisition. Alternatively, the reply signal is a combined signal composed of a report signal from a slave and a simple signal indicating success/failure for the slave. Details of the reply signal depend on actual applications and are not limited herein, and all shall fall within the protection scope of the present disclosure.

The reply signal may be an analog signal or a modulated signal. An element of the reply signal varies with a type of the reply signal. In a case that the reply signal is an analog signal, the reply signal is the combined signal. That is, the reply signal includes a report signal from a slave and a simple signal indicating success/failure for the slave. In a case that the reply signal is a modulated signal, the reply signal is the simple signal indicating success/failure.

In practice, in a case that the reply signal is a modulated signal, for example, a power line carrier signal or a wireless communication signal, the reply signal from the master is sufficient to confirm the status of the master by the slave. Determination based on both the report signal from the slave and the reply signal from the master is unnecessary. That is, the reply signal is a simple signal indicating success/failure. In a case that the reply signal is an analog signal, determination is based on a combined signal composed of a report signal from a slave and a simple signal indicating success/failure for the slave for the sake of reliability. That is, the reply signal is a combined signal.

In practice, the slave sends the report signal to the master as follows. Slaves send the report signal to the master one by one in a report order in a preset list. Alternatively, the slaves send the report signal to the master one by one in another order, for example, randomly send report the signal to the master one by one or send the report signal to the master one by one in a different order, which is not described in detail herein and falls within the protection scope of the present disclosure.

Figure 5:
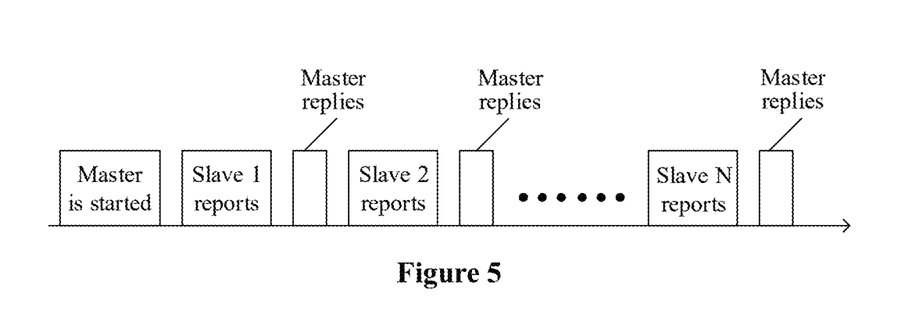
FIG. 5 is a schematic diagram illustrating data flow in a communication method for a photovoltaic system according to an embodiment of the present disclosure.

After a round of communication in which all the slaves each send the report signal to the master and monitor the reply signal, a next round of communication is started, so that each slave continues to communicate with the master. Data flow in the communication is shown in FIG. 5.

Description is made by an example in which all the slaves send the report signal to the master one by one in the report order in the preset list. The preset list in each slave is uniformly configured by the master. For example, the master sets the preset list in itself, and sends the preset list to each slave, so that each slave stores the preset list. That is, the master and each slave are provided with the preset list, and the preset list in the master is identical to the preset list in each slave so that all the slaves in the photovoltaic system send the report signal to the master orderly. For example, a first slave sends a report signal to the master first, the second slave sends a report signal to the master after the first slave sends the report signal to the master, and so on. For example, the first slave sends a report signal to the master first, and an nth slave sends a report signal to the master after an (n-1)th slave sends a report signal to the master, where n is the number of slaves.

In addition, the report order in the preset list may be an ascending order or a descending order. That is, all the slaves send the report signal in ascending order or in descending order. Alternatively, all the slaves send the report signal in a random order, which is not limited herein, and all shall fall within the protection scope of the present disclosure.

The preset list is described with the ascending order as an example, and is shown in Table 1.

TABLE 1

| Preset List | |
|---|---|
| Report order | Slave number |
| 1 | Slave A |
| 2 | Slave B |
| 3 | Slave C |
| ... | ... |
| N | Slave N |

As can be seen from Table 1, a slave A sends a report signal first, a slave B sends a report signal second, a slave C sends a report signal third, and so on. A slave N sends a report signal Nth. The slave number is a unique serial number set for the slave when leaving the factory. That is, the slave number may serve as an identifier of the slave.

Figure 6:
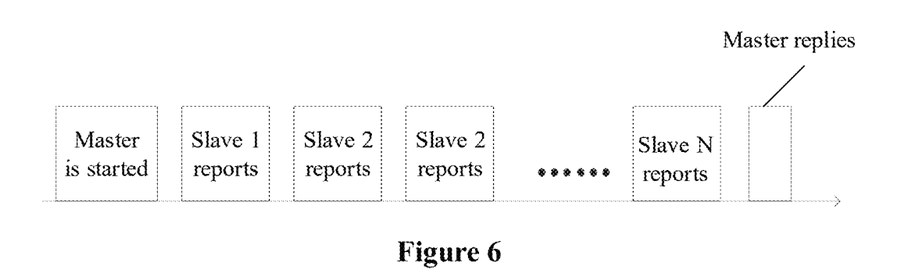
FIG. 6 is a schematic diagram illustrating data flow in a communication method for a photovoltaic system according to an embodiment of the present disclosure.

The interaction between each slave and the master may be as follows. The slave monitors a reply signal immediately after the slave sends a report signal to the master, and data flow in this communication is shown in FIG. 5. Alternatively, the slave monitors a reply signal after all the slaves send respective report signals to the master, and data flow in this communication is shown in FIG. 6. The interaction between the slave and the master is not limited herein, and all shall fall within the protection scope of the present disclosure.

The report signal includes: state information such as a voltage, a current and a temperature of the slave, and/or a serial number of the slave, i.e., the slave number.

The method proceeds to step S102 in response to a fact that at least one slave successfully receives a reply signal.

In S102, the slave that successfully receives the reply signal performs an action based on the reply signal.

The action performed by the slave corresponds to a content in the reply signal. For example, in a case that the reply signal is a simple signal indicating success/failure, the slave remains on in a case that the reply signal indicates success, and the slave is shut down in a case that the reply signal indicates failure. The correspondence between the action performed by the slave and the content of the reply signal is not limited to the above correspondence, and all other correspondences are not described in detail herein and shall fall within the protection scope of the present disclosure.

In a case that the reply signal is of another type, a correspondence between the content of the reply signal and the action performed by the slave depends on actual applications and is not described in detail herein, and all shall fall within the protection scope of the present disclosure.

In the embodiment, each slave sends a report signal to the master and monitors a reply signal sent by the master. In a case that at least one slave successfully receives a reply signal, the slave successfully receiving the reply signal performs an action based on the received reply signal. Therefore, each slave actively sends the report signal so that communication between the master and all the slaves is implemented. However, according to master-slave principle in the conventional technology, a request frame sent by the master includes not only a request command or control command but also address information of a target communication slave. The master according to the present disclosure only sends a reply signal after receiving a report signal from a slave rather than actively sends a request frame, thereby reducing occupation of bus resources by the master compared with the conventional technology. In addition, the reply signal sent by the master only indicates success/failure rather than carries a communication address of the slave, thereby further reducing occupation of bus resources by the master.

Figure 4:
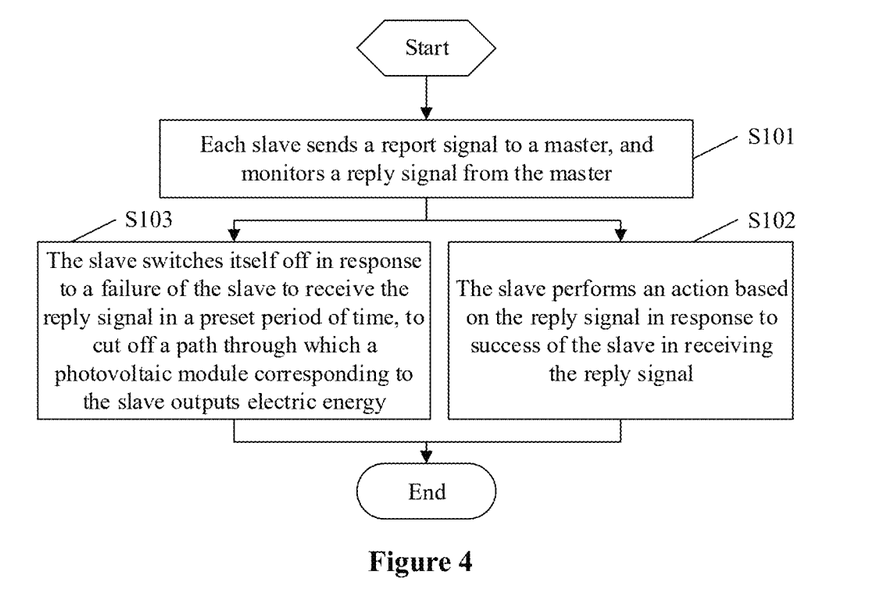
FIG. 4 is a flowchart illustrating a communication method for a photovoltaic system according to another embodiment of the present disclosure.

Optionally, referring to FIG. 4, the method proceeds to step S103 in response to a fact that at least one slave fails to receive a reply signal within a preset period of time after step S101.

In S103, the slave that fails to receive a reply signal within the preset period of time is switched off, to cut off a path through with a photovoltaic module corresponding to the slave outputs electric energy.

After the slave that fails to receive a reply signal within the preset period of time is switched off, electric energy from the photovoltaic module corresponding to the slave fails to be outputted. Therefore, the photovoltaic system can be rapidly shut down, improving the safety of the photovoltaic system.

In the embodiment, the at least one slave that fails to receive a reply signal within the preset period of time is switched off, so that a path through with a photovoltaic module corresponding to the slave outputs electric energy is cut off. Therefore, the slave can be rapidly shut down in case of a failure in the master or the slave so as to reduce a voltage of the direct current bus in the photovoltaic system, thereby avoiding the problem of aggravating the failure of the photovoltaic system due to the excessive voltage of the direct current bus, and improving the safety and reliability of the photovoltaic system.

Optionally, there are various cases for the process that the slaves each send a report signal to the master one by one in the report order in the preset list and monitor a reply signal. These cases are as follows.

(1) In practice, the process that the slaves each send a report signal to the master one by one in the report order in the preset list and monitor a reply signal is as follows. Each slave sends a report signal to the master in the report order in the preset list and monitors a reply signal immediately after sending the report signal.

Referring to FIG. 5, after the master is started and each slave is switched on, a slave 1 reports, i.e., the slave 1 sends a report signal to the master, and then the master replies, i.e., the master sends a reply signal after receiving the report signal from the slave 1. A slave 2 reports, i.e., the slave 2 sends a report signal to the master after successfully monitoring the reply signal, and then the master replies, i.e., the master sends a reply signal after receiving the report signal from the slave 2, and so on. A slave N reports, i.e., the slave N sends a report signal to the master after successfully monitoring the reply signal, and then the master replies, i.e., the master sends a reply signal after receiving the report signal from the slave N, where N is the number of slaves in the photovoltaic system. In addition, after the master receives the report signal from the slave N and sends a reply signal and the slave 1 successfully monitors the reply signal, each slave and the master repeat the above steps.

In addition, in a case that a next slave fails to monitor a reply signal within a certain period of time after a slave sends a report signal to the master, the next slave sends a report signal to the master. For example, the slave 2 fails to monitor a reply signal within a certain period of time after the slave 1 sends a report signal, and then the slave 2 sends a report signal to the master. A next slave sends a report signal to the master in response to its failure to monitor a reply signal within a certain period of time after a slave sends a report signal to the master, thereby avoiding interruption in communication of each slave.

(2) In a case that there are few slaves in the photovoltaic system, the master replies one time after all the slaves each send a report signal rather than replies to the report signals of the slaves separately in order to further speed communication of the photovoltaic system up. That is, the process that the slaves each send a report signal to the master one by one in the report order in the preset list and monitor a reply signal is as follows. Each slave sends a report signal to the master in the report order in the preset list, and all the slaves monitor a reply signal simultaneously after all the slaves each send a report signal to the master.

Referring to FIG. 6, after the master is started and each slave is switched on, a slave 1 reports, i.e., the slave 1 sends a report signal to the master. A slave 2 reports, i.e., the slave 2 sends a report signal to the master, and so on. A slave N reports, i.e., the slave N sends a report signal to the master. After the slave N reports, i.e., after all the slaves report, all the slaves monitor a reply signal simultaneously. The master replies, i.e., sends a reply signal. In addition, after all the slaves successfully monitor the reply signal, each slave and the master repeat the above steps.

In practice, after the photovoltaic system is mounted already, the master sends the preset list to all the slaves, so that each slave is provided with the preset list. After the photovoltaic system is mounted already, the master receives a report signal from each slave. The report signal includes a serial number of the slave. According to a preset program or external input, the master summarizes and sorts the serial numbers of all slaves to obtain the preset list shown in Table 1, and then sends the preset list to each slave.

Optionally, after the photovoltaic system is started, the method further includes: updating, by the master, the preset list in each slave.

Each slave and the master are provided with the preset list. The master may update the preset list in each slave by updating its own preset list. For example, the master sends an updated preset list to all the slaves after updating its own preset list. The slave updates its own preset list after receiving the updated preset list from the master. However, updating of the preset list is not limited to the above, and all solutions for updating the preset list in each slave fall within the protection scope of the present disclose, and are not described in detail herein. For example, in a case that a slave number in the photovoltaic system changes, such as adding a slave or replacing a slave, the master updates its own preset list and sends the preset list to all the slaves.

Alternatively, after each start of the photovoltaic system, the master sends the latest preset list stored by itself to all the slaves, which depends on actual applications, and all shall fall within the protection scope of the present disclosure.

It should be noted that, after the photovoltaic system is started, the master may first control all the slaves to be switched on, so that each photovoltaic module outputs electric energy. After that, each slave sends the report signal to the master normally. For example, each slave reports various state parameters to the master periodically. The master controls each slave to be switched on in a manner depending on applications, and two cases of the manner are described in the embodiment.

(1) After the photovoltaic system is started, the master sends a start signal to each slave until all the slaves are switched on already. That is, the master first sends a start signal to each slave. In a case that a voltage of each photovoltaic module is always low, for example, irradiance is insufficient in an early morning, the master keeps sending the start signal in a cycle predetermined by the master. As the irradiance increases, the voltage of each photovoltaic module gradually increases. Therefore, the slave is switched on in response to the start signal, so that the photovoltaic module corresponding to the slave outputs electric energy successfully.

(2) After the photovoltaic system is started, each slave actively detects a voltage of the photovoltaic module corresponding to the slave and reports the voltage of the photovoltaic module. Only after the voltage of each photovoltaic module is sufficient, the master controls the slave to be switched on. That is, each slave actively detects a voltage of a photovoltaic module connected to the slave (i.e., a voltage inputted to the slave), and then reports the voltage of the photovoltaic module to the master through the report signal. The master calculates a sum of voltages of all the photovoltaic modules carried in respective report signals (i.e., calculates a voltage of a photovoltaic string), and determines whether the sum of the voltages of all the photovoltaic modules is sufficient to start an inverter in the photovoltaic system. If it is determined that the sum of the voltages of all the photovoltaic modules is sufficient to start the inverter, a condition for sending a reply signal carrying a start command is met. Then, the master sends the reply signal carrying the start command, so that all the slaves are switched on and photovoltaic modules respectively corresponding to the slaves output electric energy successfully.

It should be noted that the start of the photovoltaic system indicates that there are no other faults, such as overvoltage and undervoltage of a grid voltage, over frequency and under frequency of the grid voltage, and artificially pressed rapid shutdown button, in the photovoltaic system except undervoltage of the direct current bus. In this case, the photovoltaic system allows each slave to be switched on, so that each photovoltaic module outputs electric energy. Moreover, after the photovoltaic system is started, the communication function of the master is also activated. If each slave is powered on already, that is, there is auxiliary power supply, the communication function of the slave is activated. However, if the slave is not powered on, that is, there is no auxiliary power supply, the communication function of the slave is not activated.

It should be noted that, in case (1), the master sends a start signal regardless of whether each slave is powered on or not. That is, in a case that no respond by the slave after the master sends the start signal to the slave, for example, the slave fails to respond after the master sends the start signal to the slave since auxiliary power supply of the slave is cut off at night, the master sends the start signal until each slave is provided with auxiliary power supply and the voltage of the photovoltaic module is sufficient to switch the slave on.

In case (2), the master waits for each slave to be powered on. For example, after each slave is provided auxiliary power supply during the day, the slave actively detects the voltage of the photovoltaic module and sends the report signal. After that, the master sends the reply signal carrying the start command to switch the slave on if the voltage of the photovoltaic module is sufficient to switch the slave on. In this case, the master is prevented from sending the start signal for a long period of time in a case that each slave fails to respond for a long period of time, for example, at night. Therefore, the implementation described in (2) is preferred.

In practice, the condition for sending a reply signal carrying a start command may be that at least one of the number or a proportion of received report signals and a rate at which each slave succeeds in communication meets a preset condition, which depends on actual applications and is not described in detail herein, and all shall fall within the protection scope of the present disclosure.

Figure 7:
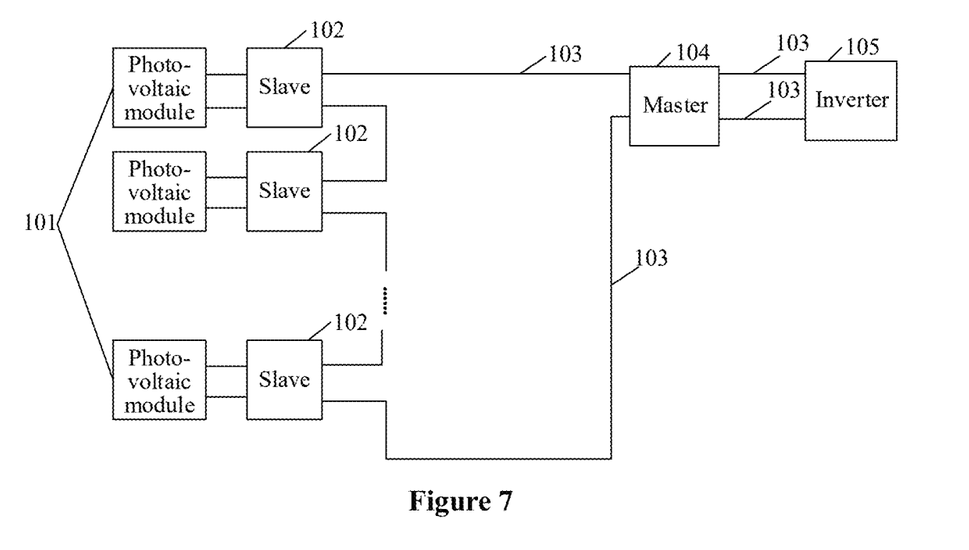
FIG. 7 is a schematic structural diagram illustrating a photovoltaic system according to another embodiment of the present disclosure.
Figure 8:
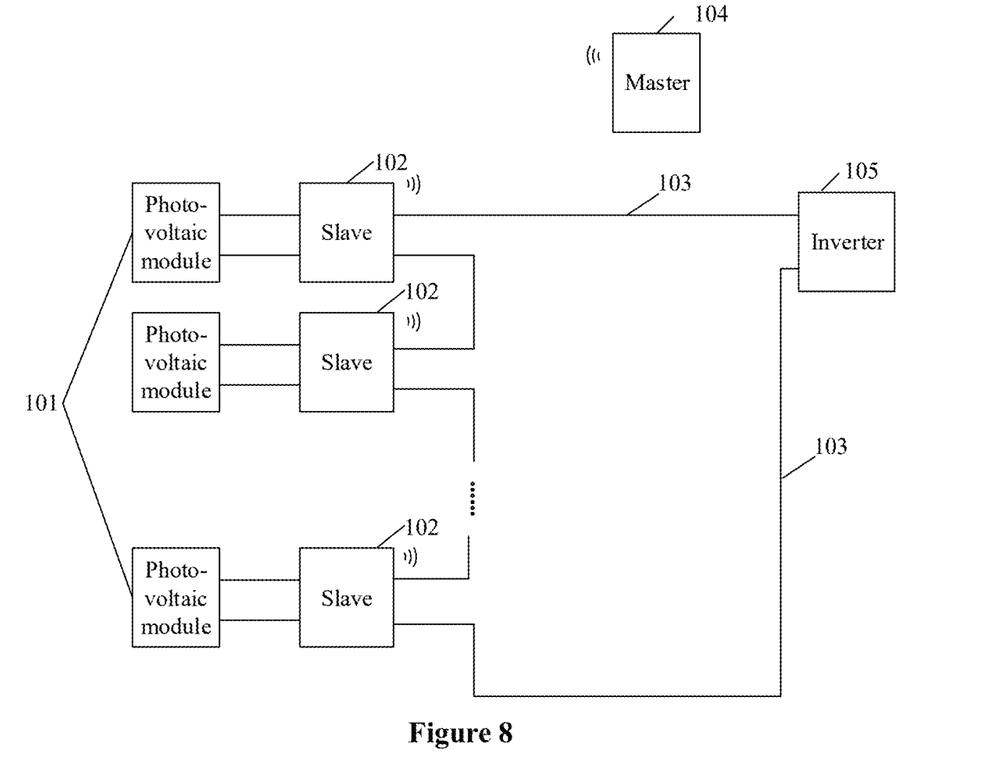
FIG. 8 is a schematic structural diagram illustrating a photovoltaic system according to another embodiment of the present disclosure.

A photovoltaic system is provided according to an embodiment of the present disclosure. Referring to FIG. 2, FIG. 7 and FIG. 8, the photovoltaic system includes: a direct current bus 103, at least one inverter 105, at least one master 104, N slaves 102 and N photovoltaic modules 101, where N is a positive integer.

Output ends of the N slaves 102 are cascaded to from a first branch. Input ends of the N slaves 102 are connected to output ends of the N photovoltaic modules 101 in a one-to-one correspondence. A positive electrode and a negative electrode of the first branch are connected to a direct current side of the inverter 105 via the direct current bus 103. The master 104 is communicatively connected to each of the N slaves 102.

Each slave 102 and the master 104 form a communication system, and the communication system performs interactive operations such as information transmission, service inquiry, and command control.

It should be noted that the slave 102 is a circuit breaker or an optimizer in the photovoltaic system. The master 104 may be a controller inside the inverter 105 (as shown in FIG. 2). The master 104 is communicatively connected to each slave 102 through power line carrier communication or wireless communication. Alternatively, the master 104 is an independent controller. The form of the master 104 depends on actual applications and is not limited herein, and all shall fall within the protection scope of the present disclosure.

In a case that the master 104 is an independent controller, the master 104 may be an independent controller that is arranged on the direct current bus 103 and communicatively connected to each slave 102 through power line carrier communication (as shown in FIG. 7). Alternatively, the master 104 is an independent controller that is communicatively connected to each slave 102 through wireless communication (as shown in FIG. 8). The position of the master 104 in the photovoltaic system depends on actual applications and is not limited herein, and all shall fall within the protection scope of the present disclosure.

In practice, the photovoltaic module 101 includes at least one photovoltaic assembly. In a case that the photovoltaic module 101 includes one photovoltaic assembly, an output end of the photovoltaic assembly is connected to an input end of the slave 102 corresponding to the photovoltaic module 101. In a case that the photovoltaic module 101 includes at least two photovoltaic assemblies, output ends of the at least two photovoltaic assemblies are connected in parallel, and a joint at which the output ends of the at least two photovoltaic assemblies joined together is connected to an input end of the slave 102 corresponding to the photovoltaic module 101. Alternatively, the at least two photovoltaic assemblies are connected in series to form a second branch, and an output end of the second branch is connected to an input end of the slave 102 corresponding to the photovoltaic module 101. The at least two photovoltaic assemblies may be connected in both series and parallel, which is not described in detail herein, but all shall fall within the protection scope of the present disclosure.

It should be noted that when all the slaves 102 are switched off, all the photovoltaic modules 101 stop outputting electric energy, and no electric energy is inputted to the direct current bus 103. When all the slaves 102 are switched on, all the photovoltaic modules 101 output electric energy successfully, and the electric energy through the direct current bus 103 is inverted and outputted by the inverter 105.

The master 104 and each slave 102 are configured to perform the communication method for the photovoltaic system according to any one of the above embodiments. The process and principle of the communication method for the photovoltaic system refer to the above embodiments for details, and thus are not repeated here.

The embodiments in this specification are described in a progressive manner. The same or similar parts between embodiments can be referred to each other, and each embodiment focuses on differences from other embodiments. Since the system or the system embodiment is similar to the method embodiment, the description of the system or the system embodiment is simple, and reference may be made to the relevant part of the method embodiment. The system and the system embodiments described above are illustrative only. A unit described as a separate component may be or may be not physically separated. Components shown as units may be or not physical units, i.e., the components may be located in one place or may be distributed onto multiple network units. Some or all of the modules may be selected to achieve the objects of the solutions of the embodiments, depending on actual applications. Those skilled in the art may understand and implement the present disclosure without creative work.

Those skilled in the art should further understand that the units and algorithm steps described in examples in combination with the embodiments according to the present disclosure may be implemented by electronic hardware, computer software, or a combination of electronic hardware and computer software. In order to clearly illustrate the interchangeability between hardware and software, details and steps in each example are described in terms of functions in the above description. Whether the functions is implemented by the hardware or by the software depends on applications of the technical solution and design constraints. Those skilled in the art may implement the described functions in application-specific ways. However, such implementations should not be considered beyond the scope of the present disclosure.

Based on the above description of the disclosed embodiments, those skilled in the art can implement or deploy the present disclosure. Various modifications to these embodiments are apparent for those skilled in the art. The general principles defined herein may be applied to other embodiments without departing from the spirit or scope of the present disclosure. Therefore, the present disclosure should be defined by the widest scope consistent with the principle and novel features disclosed herein rather than limited to the embodiments illustrated herein.

The invention claimed is:

1. A communication method, applied to a photovoltaic system,
wherein in the photovoltaic system, a master is communicatively connected to each of slaves, and photovoltaic modules output electric energy via the slaves respectively;
wherein the communication method comprises:
sending, by each of the slaves, a report signal to the master and monitoring, by the slave, a reply signal from the master, wherein the reply signal is a simple signal indicating success/failure, or a combined signal composed of the report signal and the simple signal, and the response signal excludes communication address information of the slaves; and
performing an action by the slave based on the reply signal in response to successfully receiving the reply signal by the slave, comprising: remaining the slave to be on when the reply signal indicates success; and shutting down the slave when the reply signal indicates failure; and
wherein the sending, by each of the slaves, the report signal to the master comprises:
sending, by the slaves, respective report signals to the master one by one in a report order in a preset list.

2. The communication method according to claim 1, further comprising:
switching the slave off by the slave in response to failing to receive the reply signal in a preset period of time by the slave after the sending, by the slave, a report signal to the master, to cut off a path through which the photovoltaic module corresponding to the slave outputs electric energy.

3. The communication method according to claim 2, further comprising:
updating a preset list in all the slaves by the master after the photovoltaic system is started.

4. The communication method according to claim 3, further comprising:
sending the preset list by the master to all the slaves after the photovoltaic system is mounted, so that all the slaves each are configured with the preset list.

5. The communication method according to claim 1, wherein the sending, by each of the slaves, a report signal to the master and monitoring, by the slave, a reply signal from the master comprises:
sending, by the slaves, the respective report signals to the master one by one in the report order in the preset list, and monitoring, by the slave, the reply signal from the master immediately after the sending the report signal to the master by the slave.

6. The communication method according to claim 1, wherein the sending, by each of the slaves, a report signal to the master and monitoring, by the slave, a reply signal from the master comprises:
sending, by the slaves, the respective report signal to the master one by one in the report order in the preset list; and
monitoring, by all the slaves, the reply signal from the master simultaneously after all the report signals are sent to the master.

7. The communication method according to claim 1, further comprising: sending the reply signal by the master,
wherein the sending the reply signal by the master comprises:
sending the reply signal that carries a start command by the master to the slave after the sending, by the slave, a report signal to the master; or
sending a start signal by the master to the slave after the photovoltaic system is started and before the sending, by the slave, a report signal to the master, until all the slaves are switched on.

8. The communication method according to claim 7, further comprising:
determining, by the master based on all the report signals, whether a condition for sending a reply signal that carries a start command is met before the sending the reply signal that carries the start command by the master to the slave,
wherein the reply signal that carries the start command is sent if it is determined that the condition for sending the reply signal that carries the start command is met.

9. The communication method according to claim 8, wherein the determining, by the master based on all the report signals, whether a condition for sending the reply signal that carries a start command is met comprises:
calculating, by the master, a sum of voltages of all the photovoltaic modules respectively carried in all the report signals, and determining, by the master, whether the sum of the voltages of all the photovoltaic modules is sufficient to start an inverter in the photovoltaic system,
wherein the condition for sending the reply signal that carries a start command is determined to be met if it is determined that the sum of the voltages of all the photovoltaic modules is sufficient to start the inverter in the photovoltaic system.

10. The communication method according to claim 1, wherein the report signal comprises: state information of the slave and/or a serial number of the slave.

11. The communication method according to claim 1, wherein
in a case that the reply signal is a modulated signal, the reply signal is the simple signal indicating success/failure; and
in a case that the reply signal is an analog signal, the reply signal is the combined signal.

12. A photovoltaic system, comprising:
a direct current bus, at least one inverter, at least one master, N slaves and N photovoltaic modules, wherein N is a positive integer;
output ends of the N slaves are cascaded to form a branch, and input ends of the N slaves are connected to output ends of the N photovoltaic modules in a one-to-one correspondence;

a positive electrode and a negative electrode of the branch are connected to a direct current side of the inverter via the direct current bus;

the master is communicatively connected to each of the N slaves; and the master and each of the N slaves are configured to perform the communication method according to claim 1.

13. The photovoltaic system according to claim 12, wherein the slave is a circuit breaker or an optimizer in the photovoltaic system.

14. The photovoltaic system according to claim 12, wherein the master is a controller inside the inverter and is communicatively connected to each of the N slaves through power line carrier communication or wireless communication; or the master is an independent controller arranged on the direct current bus and communicatively connected to each of the N slaves through power line carrier communication; or the master is an independent controller communicatively connected to each of the N slaves through wireless communication.

15. The photovoltaic system according to claim 13, wherein the master is a controller inside the inverter and is communicatively connected to each of the N slaves through power line carrier communication or wireless communication; or the master is an independent controller arranged on the direct current bus and communicatively connected to each of the N slaves through power line carrier communication; or the master is an independent controller communicatively connected to each of the N slaves through wireless communication.

\* \* \* \* \*